US012603049B2

(12) United States Patent
Huang et al.

(10) Patent No.: US 12,603,049 B2
(45) Date of Patent: Apr. 14, 2026

(54) PIXEL CIRCUIT AND DISPLAY PANEL

(71) Applicant: AUO Corporation, Hsinchu City (TW)

(72) Inventors: Yu-Chien Huang, Hsinchu City (TW); Yung-Hsiang Lan, Hsinchu City (TW); Yung-Chih Chen, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/946,973

(22) Filed: Nov. 14, 2024

(65) Prior Publication Data

US 2026/0004728 A1 Jan. 1, 2026

(30) Foreign Application Priority Data

Jun. 27, 2024 (TW) ................................ 113124097

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01); *G09G 2320/041* (2013.01)

(58) Field of Classification Search
CPC ......... G09G 3/3233; G09G 2300/0842; G09G 2300/0861; G09G 2320/041
See application file for complete search history.

(56) References Cited

U.S. PATENT DOCUMENTS

| | | | | |
|---|---|---|---|---|
| 10,692,434 | B2 | 6/2020 | Zhang et al. | |
| 10,950,179 | B2 | 3/2021 | Zhang et al. | |
| 11,270,646 | B2 | 3/2022 | Zhang et al. | |
| 11,574,595 | B2 | 2/2023 | Zhang et al. | |
| 11,881,176 | B2 | 1/2024 | Zhang et al. | |
| 2024/0242671 | A1 * | 7/2024 | Kim | G09G 3/3233 |

FOREIGN PATENT DOCUMENTS

| | | |
|---|---|---|
| CN | 106097964 | 9/2018 |
| CN | 113870785 | 12/2021 |

* cited by examiner

*Primary Examiner* — Stacy Khoo
(74) *Attorney, Agent, or Firm* — JCIPRNET

(57) ABSTRACT

A pixel circuit and a display panel are provided. The pixel circuit includes a driving transistor, a light-emitting circuit, and a controlling circuit. The light-emitting circuit is coupled between the driving transistor and a light-emitting element. The controlling circuit is coupled to the light-emitting circuit and is coupled to the driving transistor at a first node. The controlling circuit sets a first voltage at the first node based on reference voltages according to controlling signals. During a light-emitting period, the light-emitting circuit generates an offset voltage on a first terminal of the light-emitting element according to a light-emitting signal, such that the controlling circuit sets the first voltage based on the offset voltage according to the controlling signals. Further, the driving transistor generates a driving current to the light-emitting element according to the first voltage, so that brightness of the light-emitting element at a high temperature is compensated.

9 Claims, 7 Drawing Sheets

200

PIXEL CIRCUIT AND DISPLAY PANEL

CROSS-REFERENCE TO RELATED APPLICATION

This application claims the priority benefit of Taiwan application serial no. 113124097, filed on Jun. 27, 2024. The entirety of the above-mentioned patent application is hereby incorporated by reference herein and made a part of this specification.

BACKGROUND

Technical Field

The disclosure relates to an electronic device, and in particular, relates to a pixel circuit and a display panel.

Description of Related Art

Generally, a light-emitting diode (LED) may act as a light-emitting element to be applied in a display panel. During the operating period of the display panel, the temperature of the light-emitting diode is related to the ambient temperature and is also related to its own operating time. However, when the temperature of the light-emitting diode increases, the efficiency of the light-emitting diode decreases, so the brightness of the display panel is lowered.

SUMMARY

The embodiments of the disclosure provide a pixel circuit capable of generating corresponding driving currents in response to light-emitting elements with different temperatures, such that brightness of the light-emitting elements at a high temperature is compensated.

The embodiments of the disclosure provide a pixel circuit including a driving transistor, a light-emitting circuit, and a controlling circuit. The driving transistor is configured to provide a driving current. The light-emitting circuit is coupled between the driving transistor and a light-emitting element. The light-emitting circuit is configured to provide the driving current to the light-emitting element according to a light-emitting signal. The controlling circuit is coupled to the light-emitting circuit and is coupled to the driving transistor at a first node. The controlling circuit is configured to set a first voltage at the first node based on a plurality of reference voltages according to a plurality of controlling signals. During a light-emitting period, the light-emitting circuit generates an offset voltage on a first terminal of the light-emitting element according to a light-emitting signal, such that the controlling circuit sets the first voltage based on the offset voltage according to the controlling signals. Further, the driving transistor generates the driving current according to the first voltage.

The embodiments of the disclosure further provide a display panel. The display panel includes a gate driving circuit and a plurality of the abovementioned pixel circuits. The pixel circuits are coupled to the gate driving circuit and arranged in an array.

To sum up, in the pixel circuit and the display panel provided by the embodiments of the disclosure, by setting the first voltage received by the driving transistor based on the terminal voltage (i.e., offset voltage) of the light-emitting element through the controlling circuit, the driving transistor drives the light-emitting element according to the first voltage related to the offset voltage. In this way, in response to various temperatures of the light-emitting element, the pixel circuit is able to adaptively operate based on the corresponding offset voltage, so that the brightness of the light-emitting element at high temperatures is compensated.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
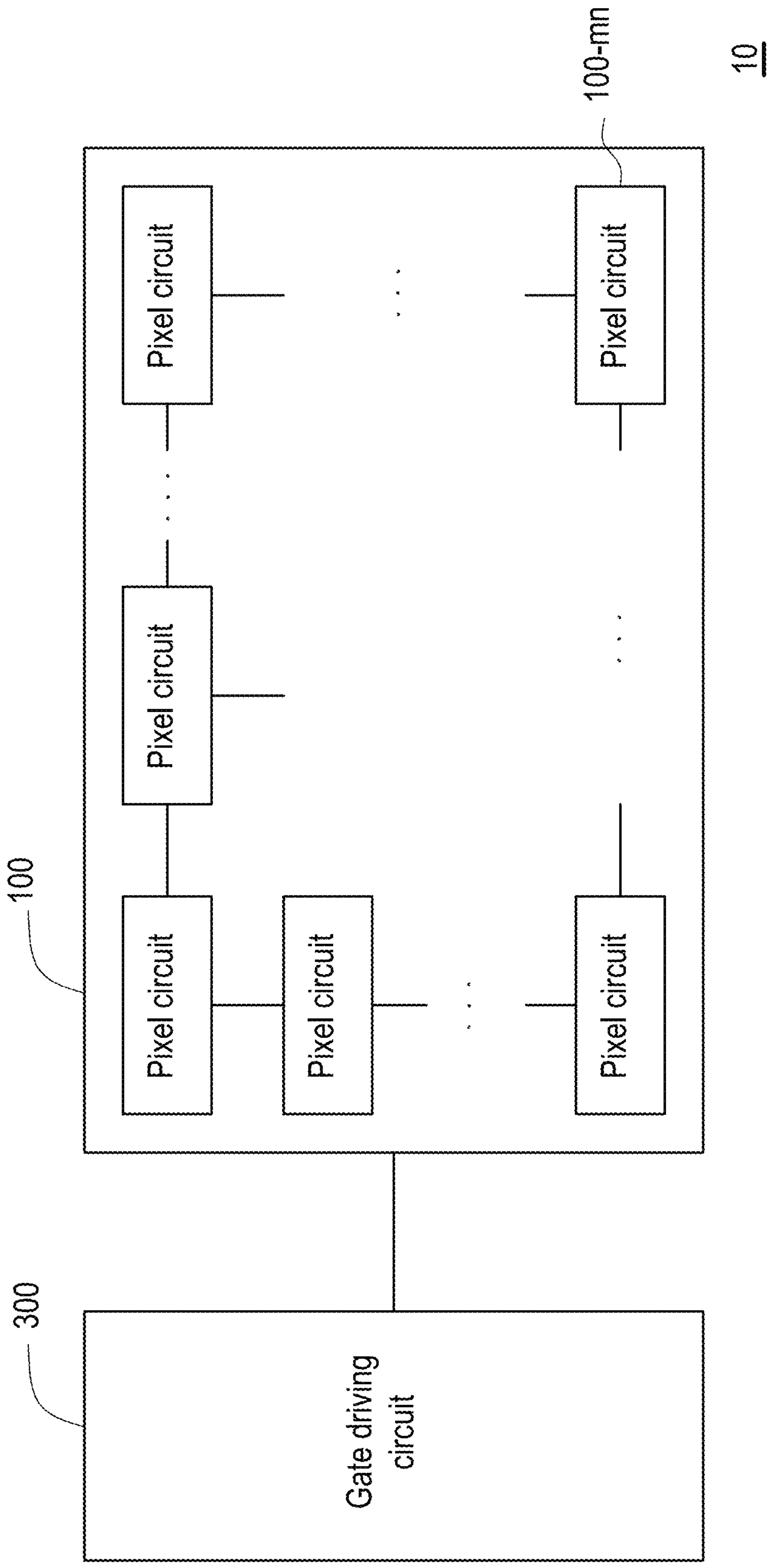
FIG. 1A is a block diagram illustrating a display panel according to an embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, these embodiments are only examples in the scope of the patent application of the disclosure.

FIG. 1A is a block diagram illustrating a display panel according to an embodiment of the disclosure. With reference to FIG. 1A, a display panel 10 includes a plurality of pixel circuits 100 to 100-*mn* and a gate driving circuit 300, where m and n are positive integers greater than 1. These pixel circuits 100 to 100-*mn* are coupled to the gate driving circuit 300 and arranged in an array. In this embodiment, the plurality of pixel circuits 100 to 100-*mn* have the same circuit structure.

Figure 1B:
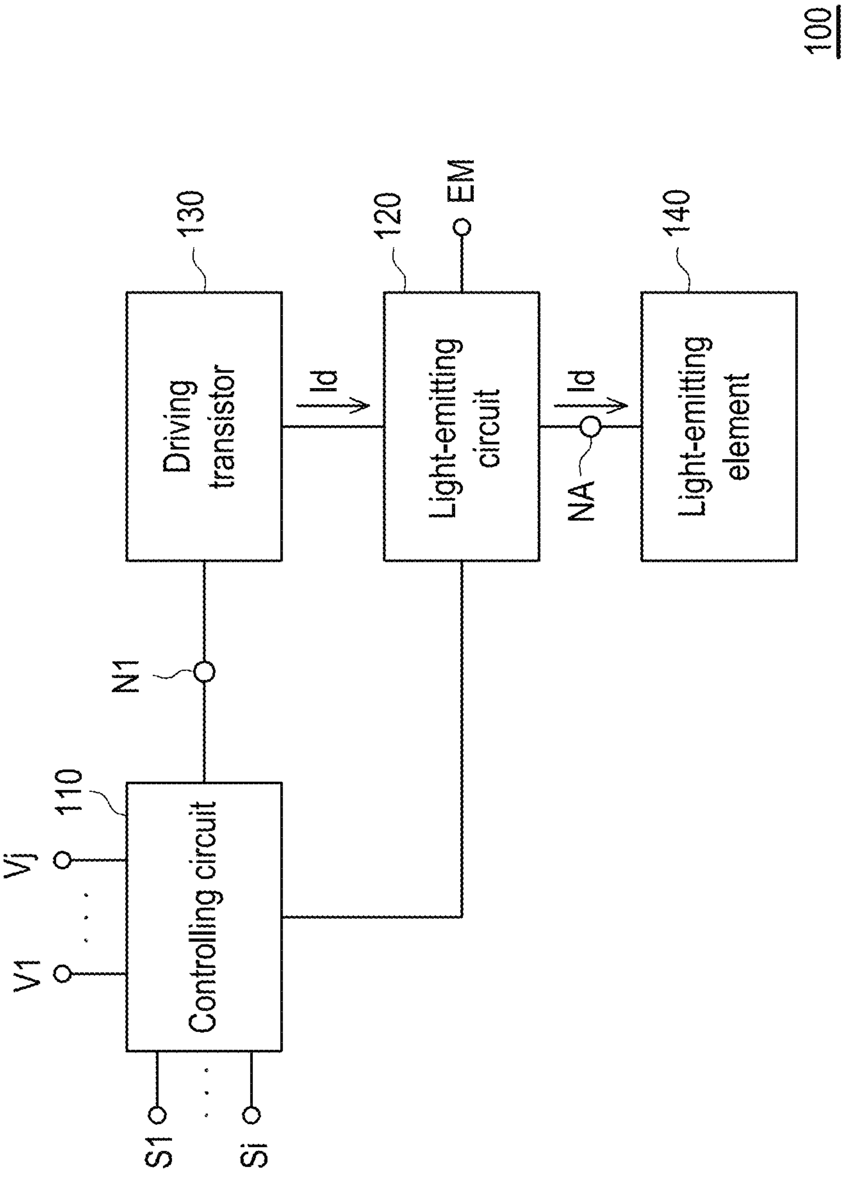
FIG. 1B is a block diagram illustrating a pixel circuit of FIG. 1A according to an embodiment of the disclosure.

With reference to FIG. 1B together, FIG. 1B is a block diagram illustrating a pixel circuit of FIG. 1A according to an embodiment of the disclosure. The pixel circuit 100 includes a controlling circuit 110, a light-emitting circuit 120, and a driving transistor 130. The controlling circuit 110 is coupled to the light-emitting circuit 120. The controlling circuit 110 is coupled to the driving transistor 130 at a first node N1. The light-emitting circuit 120 is coupled between the driving transistor 130 and a light-emitting element 140. In some embodiments, the pixel circuit 100 further includes the light-emitting element 140.

In this embodiment, the driving transistor 130 is configured to provide a driving current Id. The light-emitting circuit 120 receives the driving current Id from the driving transistor 130. The light-emitting circuit 120 receives a light-emitting signal EM as well. The light-emitting circuit 120 may operate in a light-emitting period and may be used to provide the driving current Id to the light-emitting element 140 according to the light-emitting signal EM to drive the light-emitting element 140.

In this embodiment, the controlling circuit 110 receives a plurality of controlling signals S1 to Si and a plurality of reference voltages V1 to Vj, where i and j are positive integers greater than 1. The controlling circuit 110 may operate in other periods other than the light-emitting period and is configured to set a first voltage at the first node N1 based on the reference voltages V1 to Vj according to the controlling signals S1 to Si.

In this embodiment, during the light-emitting period, the light-emitting circuit 120 generates an offset voltage on a first terminal NA of the light-emitting element 140 according to the light-emitting signal EM. The first terminal NA of the light-emitting element 140 is, for example, an anode terminal of the light-emitting element 140.

Following the above description, during the light-emitting period, the controlling circuit 110 receives the offset voltage on the terminal NA through the light-emitting circuit 120. The controlling circuit 110 sets the first voltage at the first node N1 based on the offset voltage according to the controlling signals S1 to Si. In this way, the driving transistor 130 generates the driving current Id according to this first voltage, so that the light-emitting element 140 emits light according to the driving current Id.

It is worth mentioning that during the light-emitting period, since the controlling circuit 110 operates based on the offset voltage on the first terminal NA of the light-emitting element 140, the first voltage set by the controlling circuit 110 at the first node N1 is related to a terminal voltage (i.e., offset voltage) of the light-emitting element 140. By generating the driving current Id according to this first voltage through the driving transistor 130, the pixel circuit 100 may adaptively operate based on the offset voltage in response to a current temperature of the light-emitting element 140. In this way, when the light-emitting element 140 has various temperatures (e.g., high temperature), the pixel circuit may adaptively compensate brightness of the light-emitting element.

Figure 2:
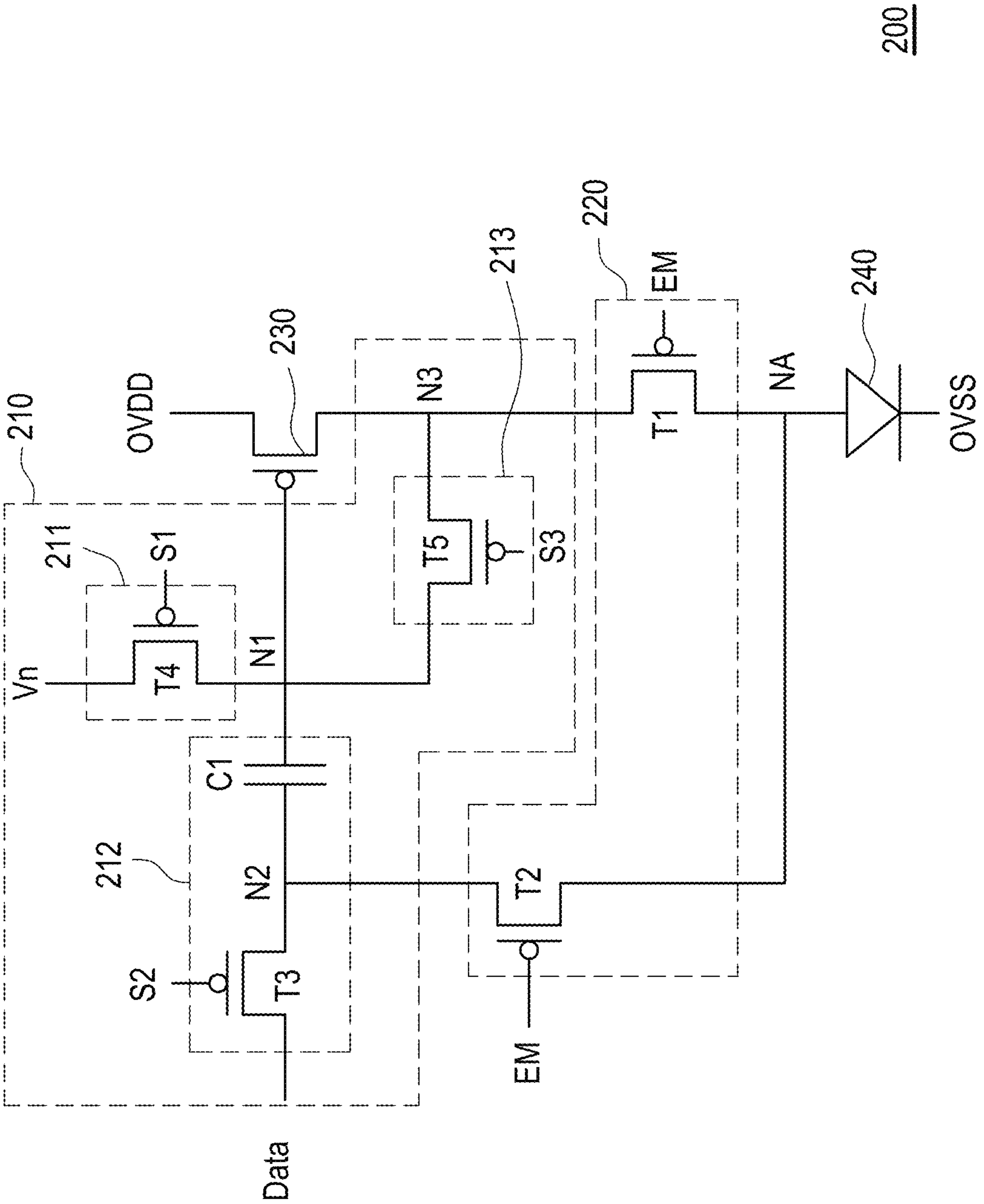
FIG. 2 is a circuit diagram illustrating a pixel circuit according to an embodiment of the disclosure.

FIG. 2 is a circuit diagram illustrating a pixel circuit according to an embodiment of the disclosure. With reference to FIG. 2, a pixel circuit 200 includes a controlling circuit 210, a light-emitting circuit 220, and a driving transistor 230. In some embodiments, the pixel circuit 200 further includes a light-emitting element 240. Description of the controlling circuit 210, the light-emitting circuit 220, the driving transistor 230, and the light-emitting element 240 may refer to the relevant description of the pixel circuit 100 and may be deduced by analogy.

In this embodiment, the driving transistor 230 is implemented by, for example, a p-type metal-oxide-semiconductor field-effect transistor (PMOSFET). A controlling terminal (i.e., gate terminal) of the driving transistor 230 is coupled at the first node N1. One terminal (i.e., first source/drain terminal) of the driving transistor 230 receives a reference voltage OVDD. The other end (i.e., second source/drain terminal) of the driving transistor 230 is coupled to the controlling circuit 210 and the light-emitting circuit 220 at a node N3.

In the embodiment shown in FIG. 2, the controlling circuit 210 includes a resetting circuit 211, a writing circuit 212, and a compensating circuit 213. The resetting circuit 211 is coupled to the first node N1. The resetting circuit 211 receives the controlling signal S1 and the reference voltage Vn. The writing circuit 212 is coupled to the first node N1. The writing circuit 212 is coupled to the light-emitting circuit 220 at a second node N2. The writing circuit 212 receives the controlling signal S2 and a reference voltage Data. The compensating circuit 213 is coupled to the first node N1. The compensating circuit 213 is coupled to the light-emitting circuit 220 and one terminal of the driving transistor 230 at the node N3. The compensating circuit 213 receives the controlling signal S3.

To be specific, the light-emitting circuit 220 includes a plurality of transistors T1 to T2. These transistors T1 to T2 are implemented as PMOSFETs, for example. The controlling terminals (i.e., gate terminals) of the transistors T1 to T2 receive the light-emitting signal EM. A first terminal (i.e., first source/drain terminal) of the transistor T1 is coupled to one terminal (i.e., second source/drain terminal) of the driving transistor 230 and the compensating circuit 213 at the node N3. A second terminal (i.e., second source/drain terminal) of the transistor T1 is coupled to the first terminal NA of the light-emitting element 240 and is also coupled to a first terminal (i.e., first source/drain terminal) of the transistor T2. A second terminal (i.e., second source/drain terminal) of the transistor T2 is coupled to the writing circuit 212 at the second node N2.

In this embodiment, the writing circuit 212 includes a transistor T3 and a capacitor C1. The transistor T3 is implemented as a PMOSFET, for example. A controlling terminal (i.e., gate terminal) of the transistor T3 receives the controlling signal S2. A first terminal (i.e., first source/drain terminal) of the transistor T3 receives the reference voltage Data. A second terminal (i.e., the second source/drain terminal) of the transistor T3 is coupled to the second terminal (i.e., second source/drain terminal) of the transistor T2 and a first terminal of the capacitor C1 at the second node N2. A second terminal of the capacitor C1 is coupled to the first node N1.

In this embodiment, the resetting circuit 211 includes a transistor T4. The transistor T4 is implemented as a PMOSFET, for example. A controlling terminal (i.e., gate terminal) of the transistor T4 receives the controlling signal S2. A first terminal (i.e., first source/drain terminal) of the transistor T4 receives the reference voltage Vn. A second terminal (i.e., second source/drain terminal) of the transistor T4 is coupled to the first node N1.

In this embodiment, the compensating circuit 213 includes a transistor T5. The transistor T5 is implemented as a PMOSFET, for example. A controlling terminal (i.e., gate terminal) of the transistor T5 receives the controlling signal S3. A first terminal (i.e., first source/drain terminal) of the transistor T5 is coupled to one terminal (i.e., second source/drain terminal) of the driving transistor 230 and the first terminal (i.e., first source/drain terminal) of the transistor T1 at the node N3. A second terminal (i.e., second source/drain terminal) of the transistor T5 is coupled to the first node N1.

In this embodiment, the light-emitting element 240 is implemented by, for example, a micron light-emitting diode (Micro LED). The first terminal NA of the light-emitting element 240 is, for example, the anode terminal of the light-emitting element 240. A second terminal of the light-emitting element 240 receives a reference voltage OVSS.

In this embodiment, the reference voltage Vn is, for example, a low voltage source signal. The reference voltage Data is, for example, a brightness signal (i.e., data signal) when the light-emitting element 240 emits light. The reference voltage OVDD is, for example, a high power signal. The reference voltage OVSS is, for example, another low voltage source signal different from the reference voltage Vn.

Figure 3:
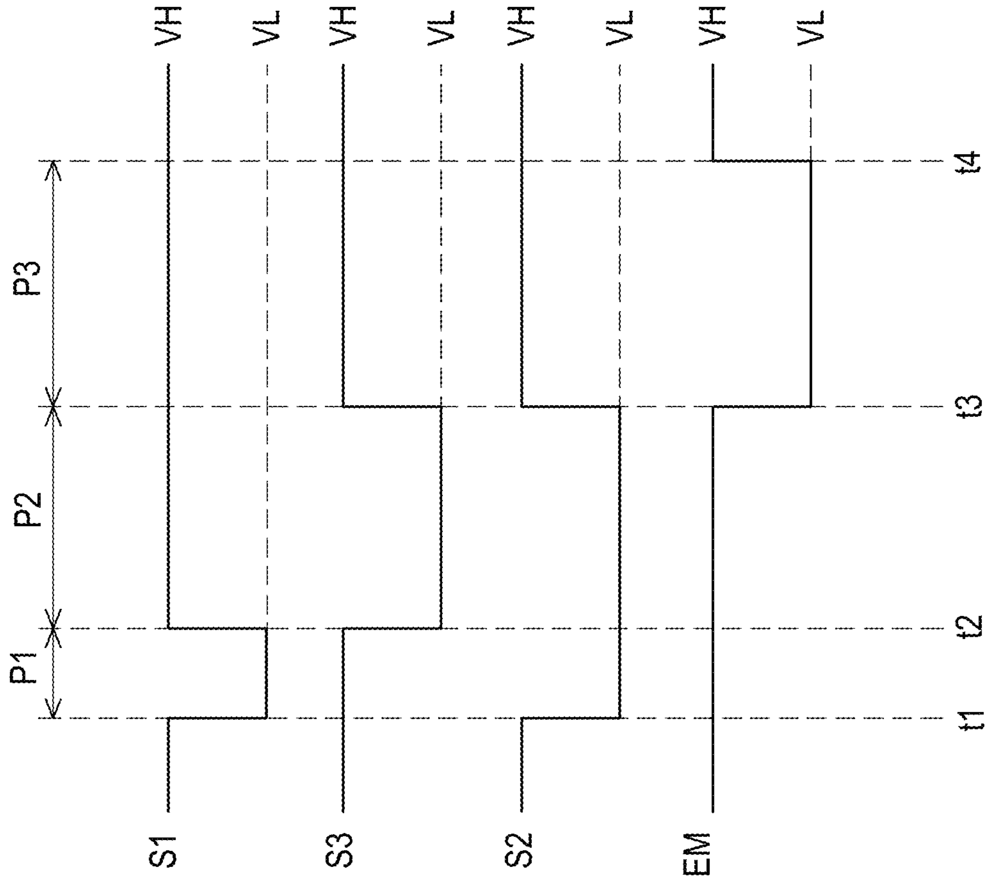
FIG. 3 is a schematic diagram illustrating an operation of the pixel circuit of FIG. 2 according an embodiment of disclosure.
Figure 4A:
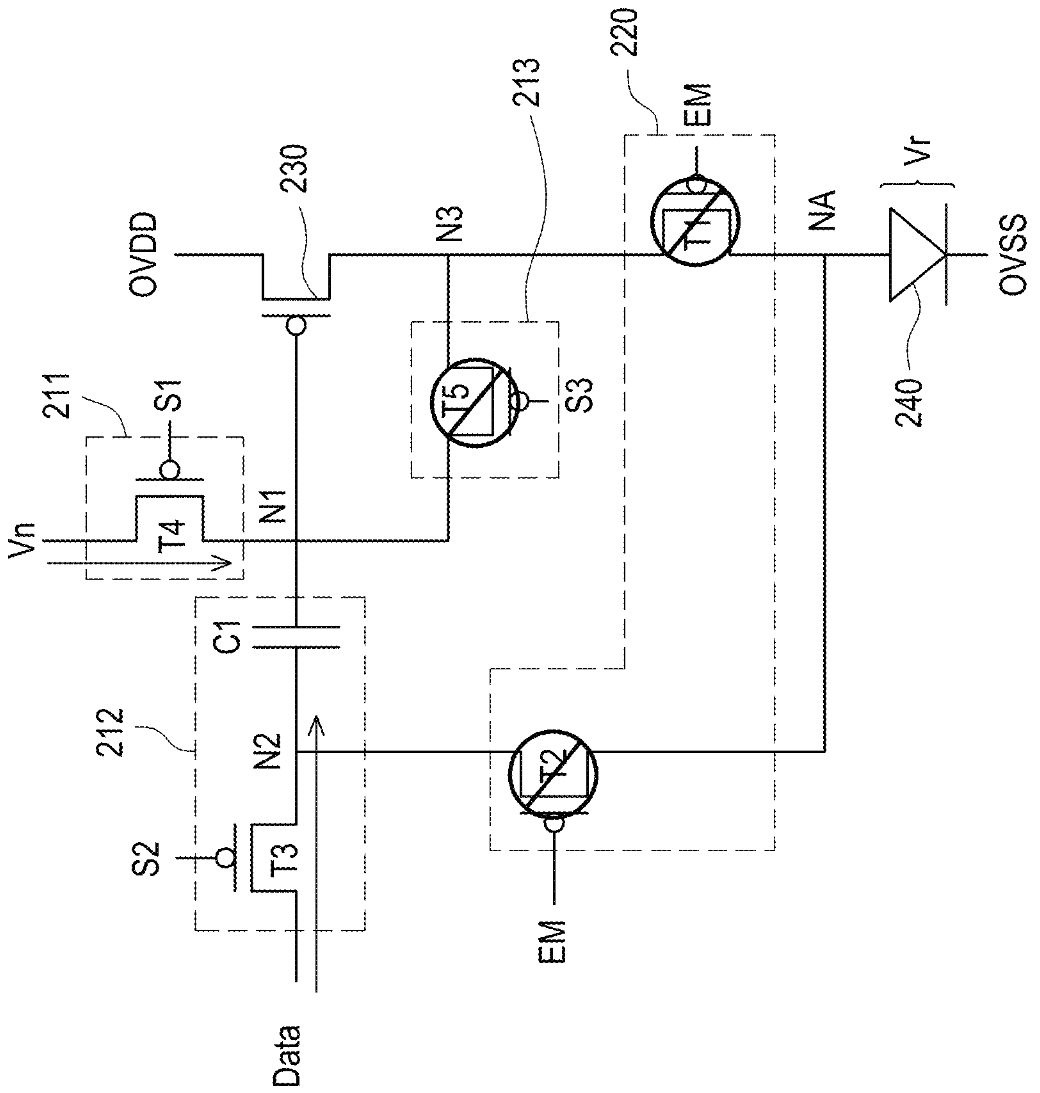
FIG. 4A to FIG. 4C are schematic diagrams illustrating the operations of the pixel circuit of FIG. 3 according an embodiment of disclosure.
Figure 4B:
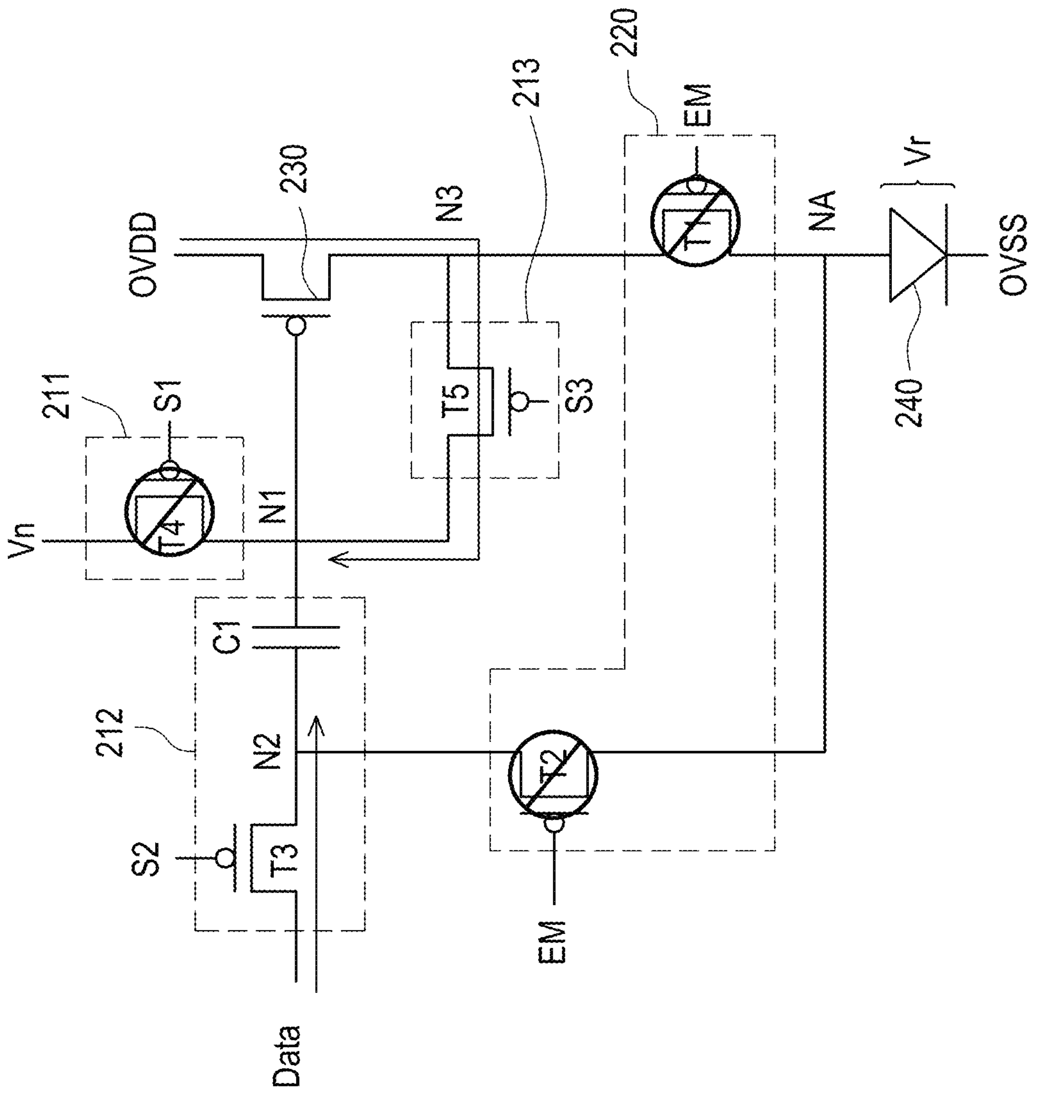
Figure 4C:
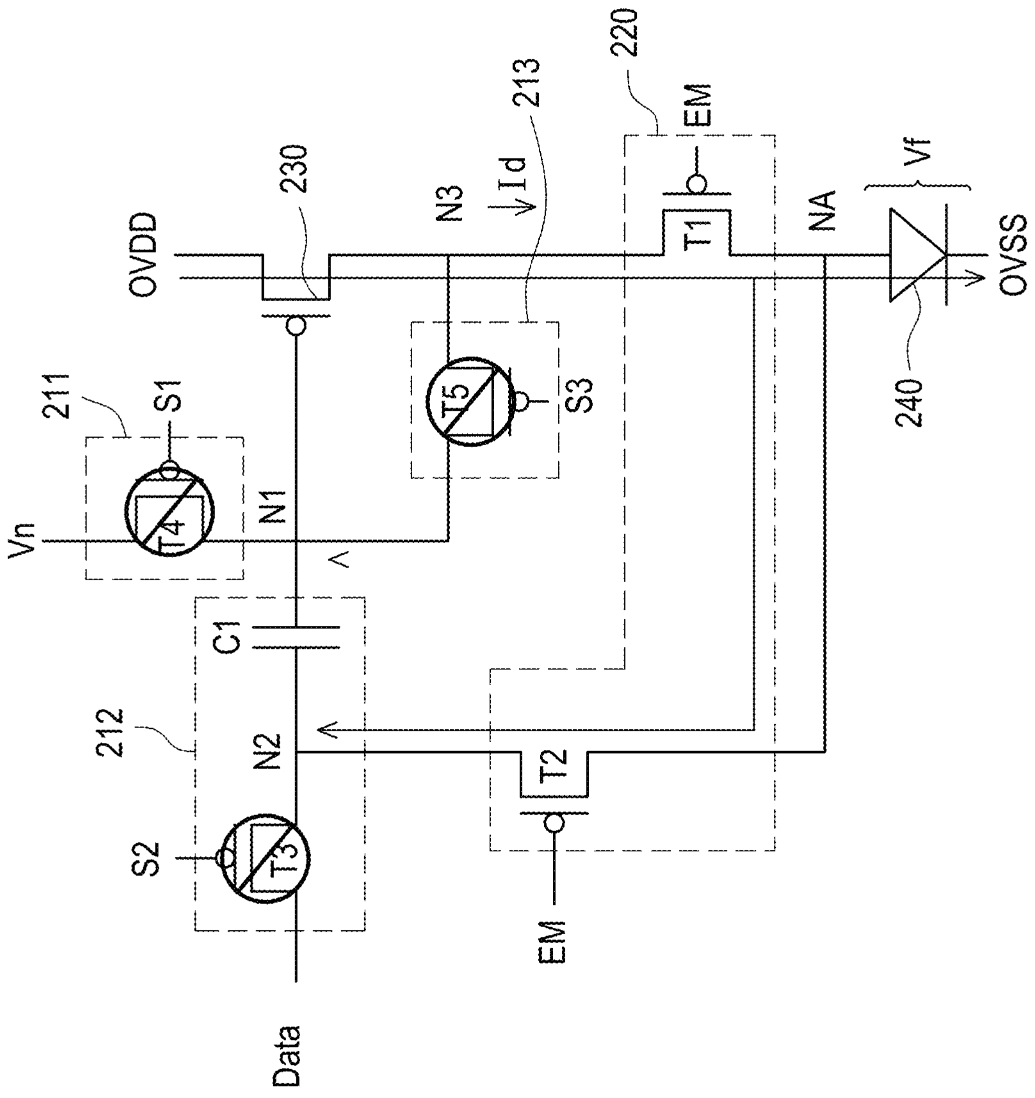

FIG. 3 is a schematic diagram illustrating an operation of the pixel circuit of FIG. 2 according an embodiment of disclosure. FIG. 4A to FIG. 4C are schematic diagrams illustrating the operations of the pixel circuit of FIG. 3 according an embodiment of disclosure. In FIG. 3, the horizontal axis represents operation time of the pixel circuit 200, and the vertical axis represents a voltage value.

In this embodiment, the light-emitting signal EM and the controlling signals S1 to S3 are, for example, independent controlling signals. The light-emitting signal EM and the controlling signals S1 to S3 are switched between different voltage levels VH and VL. The voltage level VH is, for example, a high voltage level. The voltage level VL may be, for example, a low voltage level.

For details of the operation of the pixel circuit 200 during a resetting period P1, please refer to FIG. 3 and FIG. 4A together. At time t1, the controlling signal S1 is switched from the voltage level VH to the voltage level VL to generate a falling edge, so that the pixel circuit 200 starts a resetting operation. At time t2, the controlling signal S1 is switched from the voltage level VL to the voltage level VH to generate a rising edge, so that the pixel circuit 200 ends the resetting operation.

During the resetting period P1 (i.e., time t1 to t2), the resetting circuit 211 resets the first voltage at the first node N1 based on the reference voltage Vn according to the controlling signal S1. To be specific, the transistor T4 is controlled by the controlling signal S1 having the voltage level VL to be turned on, so as to pull the first voltage at the first node N1 to the reference voltage Vn. At this time, the driving transistor 230 is controlled by the first voltage and is turned on.

In addition, the transistor T3 is controlled by the controlling signal S2 having the voltage level VL and is turned on, so as to pull the voltage at the second node N2 to the reference voltage Data. The transistor T5 is controlled by the controlling signal S3 having the voltage level VH and is turned off. The transistors T1 to T2 are controlled by the light-emitting signal EM having the voltage level VH and are turned off.

In this way, the first terminal NA of the light-emitting element 240 is in a floating state. The voltage at the first terminal NA of the light-emitting element 240 is expressed by the following formula (1), for example. In the formula (1), VNA is a voltage value at this terminal NA, OVSS is a voltage value of the reference voltage OVSS, and Vr is a cross-voltage value when the light-emitting element 240 is in a floating state.

$$VNA = OVSS + Vr \qquad \text{formula (1)}$$

For details of the operation of the pixel circuit 200 during a writing and compensating period P2, please refer to FIG. 3 and FIG. 4B together. At time t2, the controlling signal S3 is switched from the voltage level VH to the voltage level VL to generate a falling edge, so that the pixel circuit 200 starts a writing and compensating operation. At time t3, the controlling signal S3 is switched from the voltage level VL to the voltage level VH to generate a rising edge, so that the pixel circuit 200 ends the writing and compensating operation.

During the writing and compensating period P2 (i.e., time t2 to t3), the driving transistor 230 remains turned on. The compensating circuit 213 sets the first voltage at the first node N1 based on the reference voltage OVDD according to the controlling signal S3, so as to compensate for a critical voltage value of the driving transistor 230. Further, the writing circuit 212 sets the first voltage based on the reference voltage Data according to the controlling signal S2, so as to write grayscale data for the light-emitting element 240 to emit light.

To be specific, the transistor T4 is controlled by the controlling signal S1 having the voltage level VH and is turned off. The transistor T5 is controlled by the controlling signal S3 having the voltage level VL and is turned on, so as to pull the first voltage at the first node N1 to a voltage difference between the reference voltage OVDD and the critical voltage value of the driving transistor 230.

In addition, the transistor T3 is controlled by the controlling signal S2 having the voltage level VL and is turned on, so as to pull the voltage at the second node N2 to the reference voltage Data. The capacitor C1 stores the reference voltage Data, so that the writing circuit 212 sets the first voltage at the first node N1 based on the reference voltage Data at the second node N2.

During the writing and compensating period P2, the transistors T1 to T2 are controlled by the light-emitting signal EM having the voltage level VH and are turned off. In this way, the first terminal NA of the light-emitting element 240 is kept in a floating state. The voltage at the first terminal NA of the light-emitting element 240 is expressed by, for example, formula (1).

For details of the operation of the pixel circuit 200 during a light-emitting period P3, please refer to FIG. 3 and FIG. 4C together. At time t3, the light-emitting signal EM is switched from the voltage level VH to the voltage level VL to generate a falling edge, so that the pixel circuit 200 starts a light-emitting operation. At time t4, the light-emitting signal EM is switched from the voltage level VL to the voltage level VH to generate a rising edge, so that the pixel circuit 200 ends the light-emitting operation.

During the light-emitting period P3 (i.e., time t3 to t4), the resetting circuit 211 and the compensating circuit 213 are disabled according to the controlling signal S1 and the controlling signal S3. Further, the light-emitting circuit 220 generates an offset voltage at the first terminal NA of the light-emitting element 240 according to the light-emitting signal EM and pulls the voltage at the node N2 to the offset voltage. The writing circuit 212 couples the offset voltage at the node N2 to the first node N1 according to the controlling signal S2. The driving transistor 230 generates the driving current Id according to the first voltage at the first node N1, so as to provide the driving current Id to the light-emitting element 240 through the light-emitting circuit 220.

To be specific, the transistors T3 to T5 are respectively controlled by the controlling signals S1 to S3 having the voltage level VH and are turned off. The transistor T1 is controlled by the light-emitting signal EM having the voltage level VL and is turned on. The transistor T1 generates an offset voltage at the first terminal NA of the light-emitting element 240. In this embodiment, the offset voltage is related to a turn-on voltage of the light-emitting element 240.

That is, the light-emitting element 240 is turned on, and the voltage at the first end NA of the light-emitting element 240 is expressed by the following formula (2), for example. In formula (2), VNA is the voltage value at this terminal NA (i.e., voltage value of the offset voltage), OVSS is the voltage value of the reference voltage OVSS, and Vf is the cross-voltage value when the light-emitting element 240 is turned on (i.e., turn-on voltage value).

$$VNA = OVSS + Vf \qquad \text{formula (2)}$$

It should be noted that the turn-on voltage value Vf in formula (2) is related to a temperature of the light-emitting element 240. As the temperature of the light-emitting element 240 increases, the turn-on voltage value Vf decreases (i.e., becomes closer to 0). The turn-on voltage value Vf may also be called a forward offset value.

Following the above description, the transistor T2 is controlled by the light-emitting signal EM having the voltage level VL and is turned on. The transistor T2 pulls the voltage at the second node N2 to the offset voltage at the terminal NA. The capacitor C1 couples the offset voltage at the second node N2 to the first node N1.

In this way, the first voltage at the first node N1 is expressed by, for example, the following formula (3). In formula (3), VN1 is the voltage value of the first voltage, OVDD is the voltage value of the reference voltage OVDD, Vth is the critical voltage value of the driving transistor 230, OVSS is the voltage value of the reference voltage OVSS, Vf is the cross-voltage value when the light-emitting element 240 is turned on (i.e., turn-on voltage value), and Vdata is the voltage value of the reference voltage Data.

$$VN1 = OVDD - |Vth| + (OVSS + Vf - Vdata) \quad \text{formula (3)}$$

Based on the operation of the driving transistor 230, the driving current Id is expressed by, for example, the following formula (4). In formula (4), Id is a current value of the driving current Id, μ is a carrier mobility, Cox is an unit capacitance value of a gate oxide layer, W is a gate width of the driving transistor 230, L is a gate length of the driving transistor 230, OVSS is the voltage value of the reference voltage OVSS, Vf is the cross-voltage value when the light-emitting element 240 is turned on (i.e., turn-on voltage value), and Vdata is the voltage value of the reference voltage Data.

$$Id = \frac{1}{2}\mu C_{ox}\frac{W}{L}(OVSS + Vf - Vdata)^2 \quad \text{formula (4)}$$

It should be noted that, as shown in formulas (3) and (4), the first voltage VN1 at the first node N1 is related to the turn-on voltage value Vf of the light-emitting element 240. The driving current Id generated by the driving transistor 230 based on the first voltage VN1 is also related to the turn-on voltage value Vf. Since the turn-on voltage value Vf is related to the temperature of the light-emitting element 240, the first voltage VN1 and the driving current Id at the first node N1 are also related to the temperature of the light-emitting element 240.

To be specific, when the temperature of the light-emitting element 240 increases, the turn-on voltage value of the light-emitting element 240 decreases (i.e., becomes closer to 0), so that the current value of the driving current Id increases. In this way, when the light-emitting element 240 is at a high temperature, the pixel circuit 200 may increase the magnitude of the driving current Id, so that the brightness of the light-emitting element 240 is compensated. In contrast, when the temperature of the light-emitting element 240 decreases, the turn-on voltage value of the light-emitting element 240 increases (i.e., farther from 0), so that the current value of the driving current Id decreases. In this way, when the light-emitting element 240 is at a low temperature, the pixel circuit 200 may reduce the magnitude of the driving current Id, so that the brightness of the light-emitting element 240 is compensated.

In this embodiment, since the pixel circuit 200 is able to adaptively adjust the magnitude of the driving current Id, the cross voltage between the reference voltages OVDD and OVSS required by the pixel circuit 200 may be reduced.

In some embodiments, the transistors T1 to T5 and the driving transistor 230 are implemented by, for example, N-type metal-oxide-semiconductor field-effect transistors (NMOSFETs). The signals in some embodiments are inverted from the corresponding signals in this embodiment.

In view of the foregoing, in the pixel circuit and the display panel provided by the embodiments of the disclosure, the turn-on voltage value of the light-emitting element is compensated to the controlling terminal (i.e., the first node) of the driving transistor based on the offset voltage of the light-emitting element through the controlling circuit. Different driving currents may be provided under the condition that the light-emitting element has various temperatures (e.g., high temperature). In this way, in the pixel circuit, the brightness of the light-emitting element may be adaptively compensated for changes in the temperature of the light-emitting element (e.g., high temperature).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel circuit, comprising:

a driving transistor configured to provide a driving current;

a light-emitting circuit coupled between the driving transistor and a light-emitting element and configured to provide the driving current to the light-emitting element according to a light-emitting signal; and a controlling circuit coupled to the light-emitting circuit, coupled to the driving transistor at a first node, and configured to set a first voltage at the first node based on a plurality of reference voltages according to a plurality of controlling signals, wherein during a light-emitting period, the light-emitting circuit generates an offset voltage on a first terminal of the light-emitting element according to the light-emitting signal, such that the controlling circuit sets the first voltage based on the offset voltage according to the controlling signals, and the driving transistor generates the driving current according to the first voltage, wherein the controlling circuit comprises:

a resetting circuit coupled to the first node and configured to reset the first voltage based on a first reference voltage according to a first controlling signal during a resetting period;

a writing circuit coupled to the first node and the light-emitting circuit and configured to set the first voltage based on a second reference voltage according to a second controlling signal during a writing and compensating period; and a compensating circuit coupled to the first node, the light-emitting circuit, and the driving transistor and configured to set the first voltage based on a third reference voltage according to a third controlling signal during the writing and compensating period.

2. The pixel circuit according to claim 1, wherein the offset voltage is related to a turn-on voltage of the light-emitting element.

3. The pixel circuit according to claim 1, wherein during the light-emitting period, the resetting circuit and the compensating circuit are disabled according to the first controlling signal and the third controlling signal, and the writing circuit couples the offset voltage to the first node according to the second controlling signal.

4. The pixel circuit according to claim 1, wherein the light-emitting circuit comprises:

a first transistor having a controlling terminal to receive the light-emitting signal, wherein a first terminal of the first transistor is coupled to a first terminal of the driving transistor and the compensating circuit, and a second terminal of the first transistor is coupled to a first terminal of the light-emitting element; and a second transistor having a controlling terminal to receive the light-emitting signal, wherein a first terminal of the second transistor is coupled to the first terminal of the light-emitting element, and a second terminal of the second transistor is coupled to the writing circuit at a second node.

5. The pixel circuit according to claim 4, wherein the writing circuit comprises:

a third transistor having a controlling terminal to receive the second controlling signal, wherein a first terminal of the third transistor receives the second reference voltage, and a second terminal of the third transistor is coupled to the second node; and a capacitor having a first terminal coupled to the second node, wherein a second terminal of the capacitor is coupled to the first node.

6. The pixel circuit according to claim 5, wherein the resetting circuit comprises:

a fourth transistor having a controlling terminal to receive the first controlling signal, wherein a first terminal of the fourth transistor receives the first reference voltage, and a second terminal of the fourth transistor is coupled to the first node.

7. The pixel circuit according to claim 6, wherein the compensating circuit comprises:

a fifth transistor having a controlling terminal to receive the third controlling signal, wherein a first terminal of the fifth transistor is coupled to the first terminal of the driving transistor, and a second terminal of the fifth transistor is coupled to the first node.

8. The pixel circuit according to claim 7, wherein a controlling terminal of the driving transistor is coupled to the first node, and a second terminal of the driving transistor receives the third reference voltage.

9. A display panel, comprising:

a gate driving circuit; and a plurality of the pixel circuits according to claim 1, wherein the pixel circuits are coupled to the gate driving circuit and are arranged in an array.

* * * * *